(12) United States Patent
Bandholz et al.

(10) Patent No.: US 8,799,606 B2
(45) Date of Patent: Aug. 5, 2014

(54) COMPUTER MEMORY SUBSYSTEM FOR ENHANCING SIGNAL QUALITY

(75) Inventors: Justin P. Bandholz, Cary, NC (US);
Jonathan R. Hinkle, Raleigh, NC (US);
Devarshi S. Patel, Raleigh, NC (US);
Pravin S. Patel, Cary, NC (US); Kevin M. Reinberg, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/960,884

(22) Filed: Dec. 20, 2007

(65) Prior Publication Data

US 2009/0164672 A1 Jun. 25, 2009

(51) Int. Cl.
*G06F 12/00* (2006.01)

(52) U.S. Cl.
USPC ............... 711/167; 710/52; 710/58; 710/62; 710/64

(58) Field of Classification Search
USPC ............... 710/52, 58, 62, 64; 711/167
See application file for complete search history.

(56) References Cited

U.S. PATENT DOCUMENTS

| | | | |
|---|---|---|---|
| 5,892,981 A | 4/1999 | Wiggers | |
| 6,256,235 B1 | 7/2001 | Lee | |
| 6,704,818 B1 | 3/2004 | Martin et al. | |
| 7,032,092 B2 * | 4/2006 | Lai | 711/167 |
| 7,051,127 B2 | 5/2006 | Molgaard et al. | |
| 7,215,161 B2 | 5/2007 | Nguyen | |
| 7,663,436 B2 * | 2/2010 | Takano et al. | 330/149 |
| 2004/0059840 A1 * | 3/2004 | Perego et al. | 710/6 |
| 2006/0206685 A1 * | 9/2006 | Fujiki | 711/204 |
| 2006/0282582 A1 * | 12/2006 | Takemae | 710/62 |
| 2007/0121716 A1 | 5/2007 | Nagarajan et al. | |
| 2007/0291557 A1 * | 12/2007 | Nishio et al. | 365/193 |

OTHER PUBLICATIONS

Definition of Distortion, Free Dictionary, www.freedictionary.com, taken Mar. 7, 2011.*
Kim, et al.; A New Pre-Emphasis Driver Circuit for a Packet-Based DRAM; Transactions of the Korean Institute of Electrical Engineers, C; Apr. 2001; pp. 176-181; v 50, n4; Korean Inst. Electr. Eng.; South Korea.

* cited by examiner

*Primary Examiner* — Gurtej Bansal
(74) *Attorney, Agent, or Firm* — Brandon C. Kennedy; Katherine S. Brown; Biggers Kennedy Lenart Spraggins LLP (57) ABSTRACT

Computer memory subsystems are disclosed for enhancing signal quality that include: one or more memory modules; a memory bus; and a memory controller connected to the memory modules through the memory bus, the memory controller including a reception buffer connected to the memory bus, the reception buffer capable of receiving an input signal from one of the memory modules, the memory controller including a reception characteristics table capable of storing reception characteristics for each of the memory modules connected to the memory controller, the memory controller including an equalizer connected to the reception buffer and the reception characteristics table, the equalizer capable of equalizing the received input signal in dependence upon the reception characteristics for the memory module from which the input signal was received, and the memory controller including memory controller logic connected to the equalizer, the memory controller logic capable of processing the equalized input signal.

18 Claims, 6 Drawing Sheets

COMPUTER MEMORY SUBSYSTEM FOR ENHANCING SIGNAL QUALITY

BACKGROUND OF THE INVENTION

1. Field of the Invention

The field of the invention is computer memory subsystems for enhancing signal quality.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. Advances in semiconductor processing and computer architecture have served to push the performance of the computer higher and higher and have resulted in computer systems today that are much more powerful than just a few years ago.

Throughout the advancement of semiconductor processing and computer architecture, advancements in computer memory subsystems have played an important role in creating more powerful computers. To maintain the steady overall increase in computer performance, increases in the speed of computer memory subsystems have complimented increases in speed of computer processors. Over the last several years, increases in the performance of computer memory subsystems have increased by several orders of magnitude. Just a few years ago, the operational speed of computer memory subsystems was measured in kilohertz. Today, the operational speed of computer memory subsystems is measured in megahertz.

Currently, the Joint Electron Device Engineering Council ('JEDEC') serves as an important source of computer memory subsystem performance standards in the electronics industry. JEDEC was founded in 1960 and is the semiconductor engineering standardization body of the Electronic Industries Alliance ('EIA'). EIA is a trade association that represents all areas of the electronics industry and works to promulgate standards throughout the electronics industry that meet the needs of both manufacturers and consumers.

In the area of computer memory subsystem performance standards, the JEDEC standards support computer memory subsystems that include various numbers of Dual In-Line Memory Modules ('DIMM'). As the number of DIMMs in a computer memory subsystem increases, however, the speed at which the computer memory subsystem operates is reduced because increases in memory bus load increase signal distortions along the bus. These signal distortions are typically caused by signal reflections or inter symbol interference occurring in the memory bus.

SUMMARY OF THE INVENTION

Computer memory subsystems are disclosed for enhancing signal quality that include: one or more memory modules; a memory bus; and a memory controller connected to the memory modules through the memory bus, the memory controller including a reception buffer connected to the memory bus, the reception buffer capable of receiving an input signal from one of the memory modules, the memory controller including a reception characteristics table capable of storing reception characteristics for each of the memory modules connected to the memory controller, the memory controller including an equalizer connected to the reception buffer and the reception characteristics table, the equalizer capable of equalizing the received input signal in dependence upon the reception characteristics for the memory module from which the input signal was received, and the memory controller including memory controller logic connected to the equalizer, the memory controller logic capable of processing the equalized input signal.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
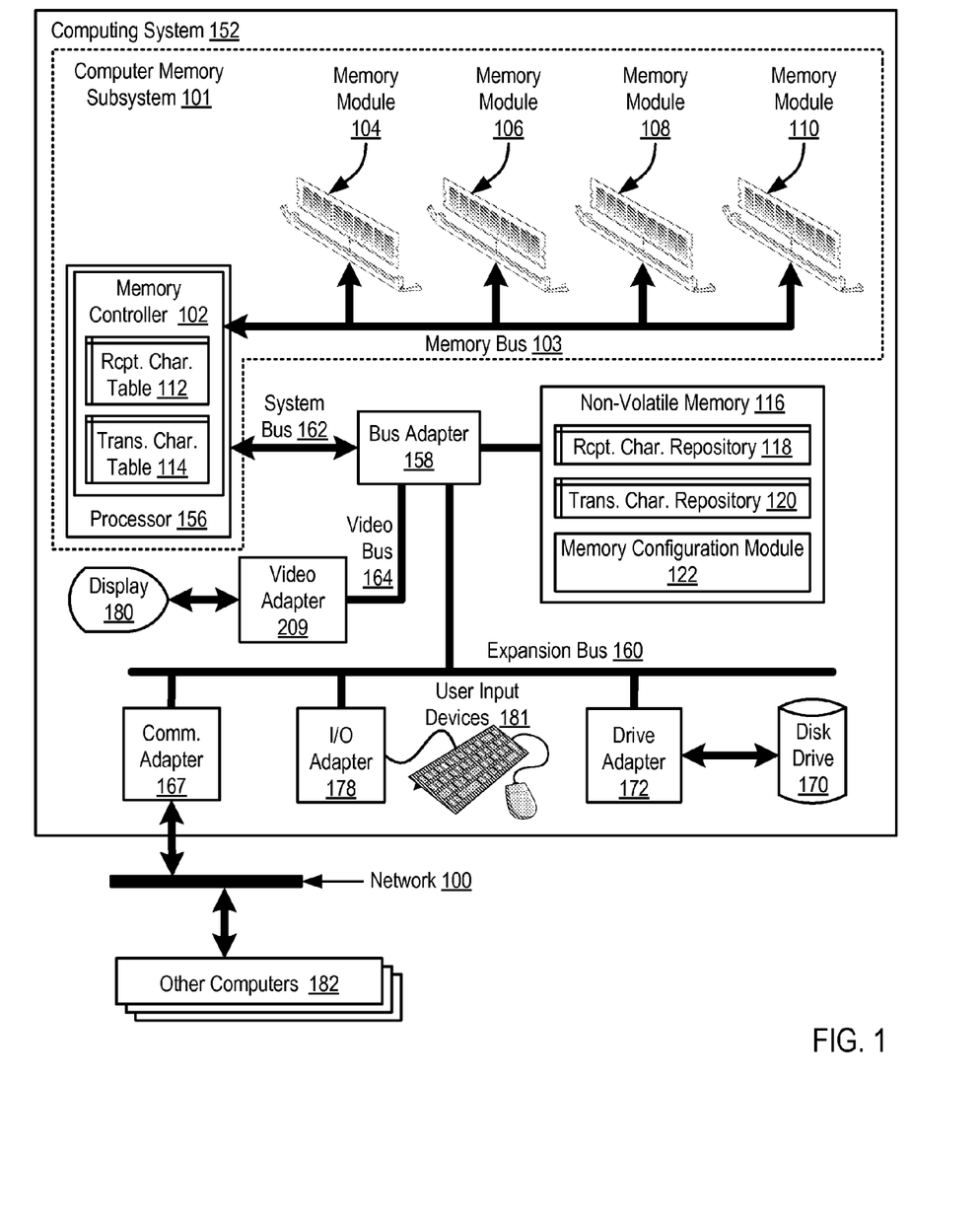
FIG. 1 sets forth a block diagram illustrating an exemplary computing system that includes an exemplary computer memory subsystem for enhancing signal quality according to embodiments of the present invention.

Exemplary computer memory subsystem for enhancing signal quality according to embodiments of the present invention are described with reference to the accompanying drawings, beginning with FIG. 1. FIG. 1 sets forth a block diagram illustrating an exemplary computing system (152) that includes an exemplary computer memory subsystem (101) for enhancing signal quality according to embodiments of the present invention. The exemplary computer memory subsystem (101) of FIG. 1 includes a four industry standard memory modules (104, 106, 108, 110). The memory modules (104, 106, 108, 110) are 'industry standard' in at least the sense that none of the memory modules (104, 106, 108, 110) are optimized to correct or adjust for signal distortions caused by the memory bus into which the memory modules are installed. That is, none of the functionality to enhance signal quality according to embodiments of the present invention in the example of FIG. 1 resides on any of the memory modules—rather, the functionality to enhance signal quality according to embodiments of the present invention is implemented in a memory controller. These industry standard memory modules may be implemented according to the double data-rate ('DDR') family of specifications promulgated by JEDEC or any other specifications as will occur to those of skill in the art.

Each memory module (104, 106, 108, 110) of FIG. 1 is a small printed circuit board or other substrate having mounted upon it a plurality of random access memory ('RAM') devices and the supporting circuitry and components for those RAM devices. The RAM devices included in each memory module (104, 106, 108, 110) in the example of FIG. 1 are integrated circuit chips that store data for access in any order. Examples of RAM devices that may be useful for computer memory subsystems for enhancing signal quality according to embodiments of the present invention may include static RAM ('SRAM'), dynamic RAM ('DRAM'), synchronous DRAM ('SDRAM'), double data rate synchronous DRAM ('DDR SDRAM'), and so on. In the example of FIG. 1, memory modules (104, 106, 108, 110) are implemented as DIMMs that include a number of DRAM memory devices.

The exemplary memory subsystem (101) of FIG. 1 also includes a memory controller (102) connected to the memory modules (104, 106, 108, 110) through a memory bus (103). The memory controller (102) of FIG. 1 is configured in a processor, or central processing unit ('CPU'), and transmits and receives electronic signals from memory modules (104, 106, 108, 110) through the memory bus (103). Memory controller (102) is component for controlling access to the RAM devices installed on memory modules (104, 106, 108, 110). The memory controller (102) of FIG. 1 generates the necessary signals to control the reading and writing of information from and to the RAM devices, and serves as an interface for the RAM devices with the processor (156). Although the memory controller (102) of FIG. 1 is integrated into the processor (156) in the example of FIG. 1, readers will note that such an implementation is for explanation only and not for limitation. In some other embodiments, the memory controller (102) may be implemented as a separate component integrated into the system chipset of a motherboard or in any other manner as will occur to those of ordinary skill in the art.

In the example of FIG. 1, the memory controller (102) operates generally for signal quality enhancement in the computer memory subsystem (101) according to embodiments of the present invention. The memory controller (102) of FIG. 1 operates generally for signal quality enhancement in the computer memory subsystem (101) according to embodiments of the present invention by: receiving an input signal from one of the memory modules (104, 106, 108, 110) included in the computer memory subsystem (101); identifying, from a reception characteristics table (112) stored in the memory controller (102), reception characteristics for the memory module from which the input signal is received; equalizing the input signal in dependence upon the identified reception characteristics; and processing the equalized signal. The memory controller (102) of FIG. 1 may also operate generally for signal quality enhancement in the computer memory subsystem (101) according to embodiments of the present invention by: generating an output signal for transmission to one of the memory modules (104, 106, 108, 110); identifying, from a transmission characteristics table (114) stored in the memory controller (102), transmission characteristics for the memory module for which the output signal is generated for transmission; pre-emphasizing the output signal in dependence upon the identified transmission characteristics; and transmitting, through the memory bus (103), the pre-emphasized output signal to the memory module for which the output signal is generated for transmission.

The reception characteristics table (112) of FIG. 1 is a data structure for storing reception characteristics for each of the memory module (104, 106, 108, 110) installed in the computing system (152), typically implemented in computer memory or registers in the memory controller (102). The reception characteristics for each memory module represent the manner in which the memory controller distorts the input signal received from that memory module to correct any signal distortion to the input signal caused by the transmission path between that memory module and the memory controller (102). The reception characteristics for each memory module may typically vary depending on that particular memory module, the manner in which that memory module is connected to the memory bus, the manner in which the memory bus (103) is configured on the motherboard, the type of equalizer used to equalize the input signal from that memory module, the location of that memory module along the memory bus (103), and other factors as will occur to those of skill in the art.

The transmission characteristics table (114) of FIG. 1 is a data structure for storing transmission characteristics for each of the memory module (104, 106, 108, 110) installed in the computing system (152), typically implemented in computer memory or registers in the memory controller (102). The transmission characteristics for each memory module represent the manner in which the memory controller distorts the output signal generated by the memory controller for transmission to that memory module to adjust for any signal distortion to the output signal caused by the transmission path between the memory controller (102) and that memory module. Similar to the reception characteristics, the transmission characteristics for each memory module may typically vary depending on that particular memory module, the manner in which that memory module is connected to the memory bus, the manner in which the memory bus (103) is configured on the motherboard, the type of pre-emphasizer used to pre-emphasize the output signal from that memory module, the location of that memory module along the memory bus (103), and other factors as will occur to those of skill in the art.

The exemplary computing system (152) also includes non-volatile computer memory (116) connected to the processor (156) through the bus adapter (158) and system bus (162). The non-volatile memory (116) may be implemented as Electrically Erasable Programmable Read-Only Memory ('EEPROM'). Although FIG. 1 illustrates the non-volatile computer memory (116) connected to the processor (156) through bus adapter (158) and system bus (162), readers will note that other configurations for connecting non-volatile memory (116) to processor (156) as will occur to those of skill in the art are also well within the scope of the present invention.

The non-volatile memory (116) of FIG. 1 includes a memory configuration module (122). The memory configuration module (122) of FIG. 1 is firmware that operates generally for signal quality enhancement in the computer memory subsystem (101) according to embodiments of the present invention. The memory configuration module (122) may be invoked as part of the boot process for the computing system (152). The memory configuration module (122) of FIG. 1 may operate generally for signal quality enhancement in the computer memory subsystem (101) according to embodiments of the present invention by: identifying the memory modules (104, 106, 108, 110) included in the computer memory subsystem (101); retrieving, from a reception characteristics repository (118), the reception characteristics for each of the identified memory modules; and storing the retrieved reception characteristics for each of the identified memory modules in the reception characteristics table (112)

of the memory controller (102). The memory configuration module (122) of FIG. 1 may also operate generally for signal quality enhancement in the computer memory subsystem (101) according to embodiments of the present invention by: identifying the memory modules (104, 106, 108, 110) included in the computer memory subsystem (101); retrieving, from a transmission characteristics repository (120), the transmission characteristics for each of the identified memory modules; and storing the retrieved transmission characteristics (120) for each of the identified memory modules in the transmission characteristics table (114) of the memory controller (102).

The reception characteristics repository (118) is a data structure that stores reception characteristics for each of the memory modules supported by the computing system (152). The reception characteristics for each of the memory modules supported by the computing system (152) may be determined by the designer or manufacturer of the computing system (152) through experimentation or simulation to minimize the signal distortions caused by the transmission pathway between that memory module and the memory controller (102). Readers will note that each of the memory modules supported by the computing system (152) may not be installed in the computing system (152). Rather, only a subset of those supported memory modules may be installed in the computing system (152) at any given time.

The transmission characteristics repository (120) is a data structure that stores transmission characteristics for each of the memory modules supported by the computing system (152). Similar to the reception characteristics, the transmission characteristics for each of the memory modules supported by the computing system (152) may be determined by the designer or manufacturer of the computing system (152) through experimentation or simulation to minimize the signal distortions caused by the transmission pathway between the memory controller (102) and that memory module. Readers will note that each of the memory modules supported by the computing system (152) may not be installed in the computing system (152). Rather, only a subset of those supported memory modules may be installed in the computing system (152) at any given time.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers having a computer memory subsystem for enhancing signal quality according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the system bus (162), which is also a high speed bus.

The exemplary computing system (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers having a computer memory subsystem for enhancing signal quality according to embodiments of the present invention include modems for wired dial-up communications, Ethernet (IEEE 802.3) adapters for wired data communications network communications, and 802.11 adapters for wireless data communications network communications.

The arrangement components making up the exemplary computer (152) illustrated in FIG. 1 are for explanation, not for limitation. Computers useful according to various embodiments of the present invention may include additional components, data communications buses, or other computer architectures, not shown in FIG. 1, as will occur to those of skill in the art. In such a manner, various embodiments of the present invention may be implemented on a variety of hardware platforms in addition to those illustrated in FIG. 1.

Figure 2:
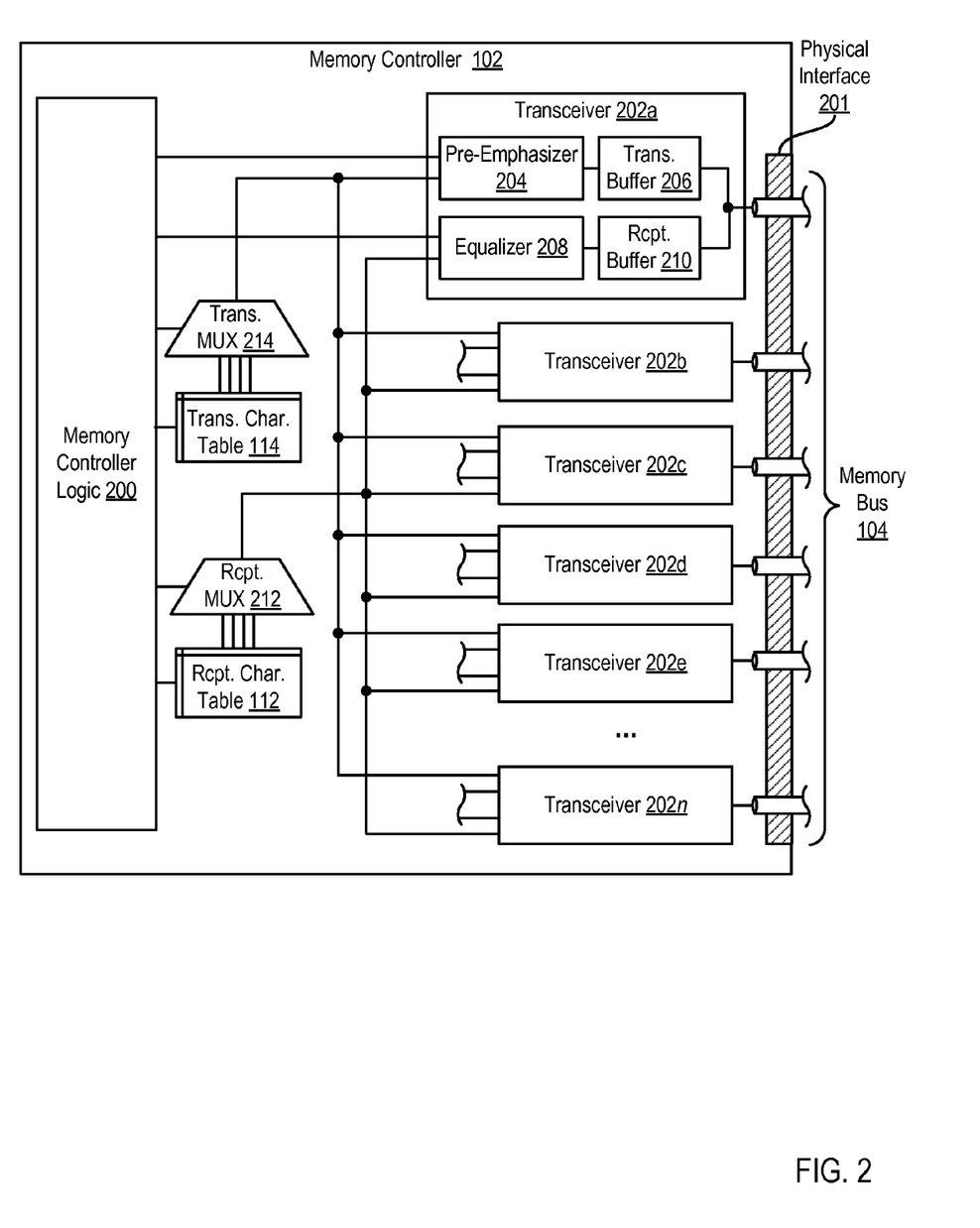
FIG. 2 sets forth a block diagram of an exemplary memory controller useful in an exemplary computer memory subsystem for enhancing signal quality according to embodiments of the present invention.

For further explanation, FIG. 2 sets forth a block diagram of an exemplary memory controller (102) useful in an exemplary computer memory subsystem for enhancing signal quality according to embodiments of the present invention. The memory controller (102) of FIG. 2 includes memory controller logic (200) that provides processing logic to read and write to the memory elements on memory modules and that provides an interface to a processor for the memory controller (102). Specifically, the memory controller logic (200) is capable of processing input signals received from memory modules and generating output signals for transmission to memory modules according to instructions provided by other components of a computing system in which the memory controller is installed.

In the example of FIG. 2, the memory controller (102) also includes a plurality of transceivers (202). Each transceiver (202) connects to a memory bus (104) through a physical interface (201). The memory bus (104) of FIG. 2 may be implemented according to the DDR family of specifications promulgated by JEDEC or any other memory bus protocol as will occur to those of ordinary skill in the art. Through the transceivers (202), the physical interface (201), and the memory bus (104), the memory controller (102) connects to one or more memory modules connected to the memory bus (104).

The memory controller (102) of FIG. 2 includes a reception characteristics table (112) capable of storing reception characteristics for each of the memory modules connected to the memory controller (102) through the memory bus (104). As mention above, the reception characteristics for each of the memory modules connected to the memory controller (102) may be stored in the reception characteristics table (112) during the boot process by a memory configuration module stored in non-volatile memory.

The memory controller (102) of FIG. 2 includes a transmission characteristics table (114) capable of storing transmission characteristics for each of the memory modules connected to the memory controller (102) through the memory bus (104). As mention above, the transmission characteristics for each of the memory modules connected to the memory controller (102) may be stored in the transmission characteristics table (114) during the boot process by a memory configuration module stored in non-volatile memory.

Each transceiver (202) of FIG. 2 includes a reception buffer (210) connected to the memory bus (104). The reception buffer (210) is capable of receiving an input signal from one of the memory modules connected to the memory bus (104). As the reception buffer (210) of FIG. 2 receives the input signal from the memory module, the reception buffer (210) may match the amplitude of the input signal to range supported by the other components of the memory controller (102).

Each transceiver (202) of FIG. 2 also includes an equalizer (208) connected to the reception buffer (210) and the reception characteristics table (114). The equalizer (208) is capable of equalizing the received input signal in dependence upon the reception characteristics for the memory module from which the input signal was received. The equalizer (208) of FIG. 2 may be implemented as an electronic component that adjusts the amplitude and timing of various frequency components of the input signal based on the reception characteristics to minimize the distorting effects of the memory bus (104).

In the example of FIG. 2, the equalizer (208) in each transceiver (202) receives the reception characteristics from a reception multiplexer (212) included in the memory controller (102). The reception multiplexer (212) of FIG. 2 is connected to the memory controller logic (200), the reception characteristics table (112), and the equalizer (208) in each transceiver (202). The reception multiplexer (212) is capable of receiving, from the memory controller logic (200), a memory module identification signal that specifies the memory module from which the input signal was received. The memory controller logic (200) generates the memory module identification signal for the reception multiplexer (212) based on the memory address for the data being retrieved from the memory modules. In the example of FIG. 2, the reception multiplexer (212) is capable of receiving from the reception characteristics table (112) the reception characteristics for each of the memory modules connected to the memory bus (104) and providing to the equalizer (208) the reception characteristics for the memory module specified by the memory module identification signal generate by the memory controller logic (200). In such a manner, the reception multiplexer (212) is used to select, from the reception characteristics table (112) in dependence upon the memory module identification signal, the reception characteristics for the memory module from which the input signal is received.

Each transceiver (202) in the example of FIG. 2 also includes a pre-emphasizer (204) connected to the memory controller logic (200) and the transmission characteristics table (114). The pre-emphasizer (204) is capable of pre-emphasizing the output signal generated by the memory controller logic (200) in dependence upon the transmission characteristics for the memory module for which the output signal is generated for transmission. The pre-emphasizer (204) of FIG. 2 may be implemented as an electronic component that adjusts the amplitude and timing of various frequency components of the input signal based on the reception characteristics to minimize the distorting effects of the memory bus (104).

In the example of FIG. 2, the pre-emphasizer (204) in each transceiver (202) receives transmission characteristics from a transmission multiplexer (214). The transmission multiplexer (214) of FIG. 2 is connected to the memory controller logic (200), the transmission characteristics table (114), and the pre-emphasizer (204). The transmission multiplexer (214) capable of receiving, from the memory controller logic (200), a memory module identification signal that specifies the memory module from which the input signal was received. The memory controller logic (200) generates the memory module identification signal for the transmission multiplexer (214) based on the memory address for the data being stored in the memory modules. In the example of FIG. 2, the transmission multiplexer (214) is capable of receiving from the transmission characteristics table (114) the transmission characteristics for each of the memory modules connected to the memory bus (104) and providing to the pre-emphasizer (204) the transmission characteristics for the memory module specified by the memory module identification signal generated by the memory controller logic (200). In such a manner, the transmission multiplexer (214) is used to select, from the transmission characteristics table (114) in dependence upon the memory module identification signal, the transmission characteristics for the memory module for which the output signal is generated for transmission.

Each transceiver (202) of FIG. 2 includes a transmission buffer (206) connected to the memory bus (104) and the pre-emphasizer (204). The transmission buffer (206) is capable of transmitting the pre-emphasized output signal to the memory module for which the output signal is generated through the memory bus (104). As the transmission buffer (206) of FIG. 2 receives the output signal from the pre-emphasizer (204), the transmission buffer (206) may match the amplitude of the pre-emphasized output signal to range supported by the memory bus (104) and the memory module to which the pre-emphasized signal is generated.

Figure 3:
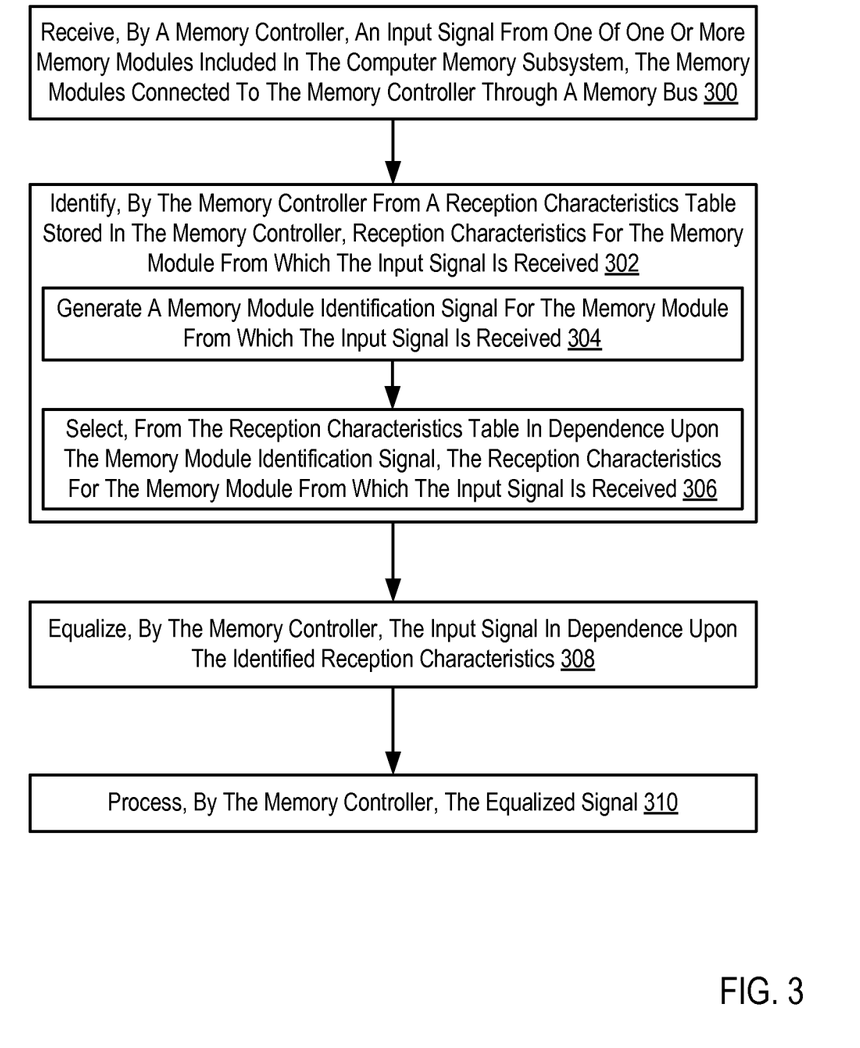
FIG. 3 sets forth a flow chart illustrating an exemplary method of signal quality enhancement in a computer memory subsystem according to embodiments of the present invention.

For further explanation, FIG. 3 sets forth a flow chart illustrating an exemplary method of signal quality enhancement in a computer memory subsystem according to embodiments of the present invention. The method of FIG. 3 includes receiving (300), by a memory controller, an input signal from one of one or more memory modules included in the computer memory subsystem. The memory module from which the input signal is received is connected to the memory controller through a memory bus. The memory controller may receive (300) the input signal from one of memory modules according to the method of FIG. 3 through a reception buffer connected to the memory modules through the memory bus.

The method of FIG. 3 also includes identifying (302), by the memory controller from a reception characteristics table stored in the memory controller, reception characteristics for the memory module from which the input signal is received. Identifying (302) reception characteristics for the memory module from which the input signal is received according to the method of FIG. 3 includes generating (304) a memory module identification signal for the memory module from which the input signal is received and selecting (306), from the reception characteristics table in dependence upon the memory module identification signal, the reception characteristics for the memory module from which the input signal is received. Because the memory controller receives the input signal from the memory module as part of a read operation from a particular memory address, the memory controller may generate (304) a memory module identification signal for the memory module from which the input signal is received according to the method of FIG. 3 using the memory address for the data to be retrieved from the memory module. The memory controller may select (306), from the reception characteristics table, the reception characteristics for the memory module from which the input signal is received according to the method of FIG. 3 by using a multiplexer and providing the memory module identification signal to the multiplexer's selection input.

The method of FIG. 3 includes equalizing (308), by the memory controller, the input signal in dependence upon the identified reception characteristics. The memory controller may equalize (308) the input signal in dependence upon the identified reception characteristics according to the method of FIG. 3 by receiving the reception characteristics as parameters into an equalizer and using the equalizer to correct the signal distortion caused by the transmission pathway between the memory module and the memory controller.

The method of FIG. 3 also includes processing (310), by the memory controller, the equalized signal. The memory controller may process (310) the equalized signal by interpreting whether the equalized signal value represents a bit value of '0' or '1' The memory controller may further process (310) the equalized signal by providing these interpreted results to the next processing stage of the memory controller as part of a read operation from the memory module from which the input signal was received.

As mentioned above, the memory controller identifies reception characteristics for the memory module from which the input signal is received from a reception characteristics table stored in the memory controller. The reception characteristics for each of the memory modules installed in the computing system may be stored in the reception characteristics table during the boot process of the computing system. For further explanation, therefore, FIG. 4 sets forth a flow chart illustrating a further exemplary method of signal quality enhancement in a computer memory subsystem according to embodiments of the present invention.

Figure 4:
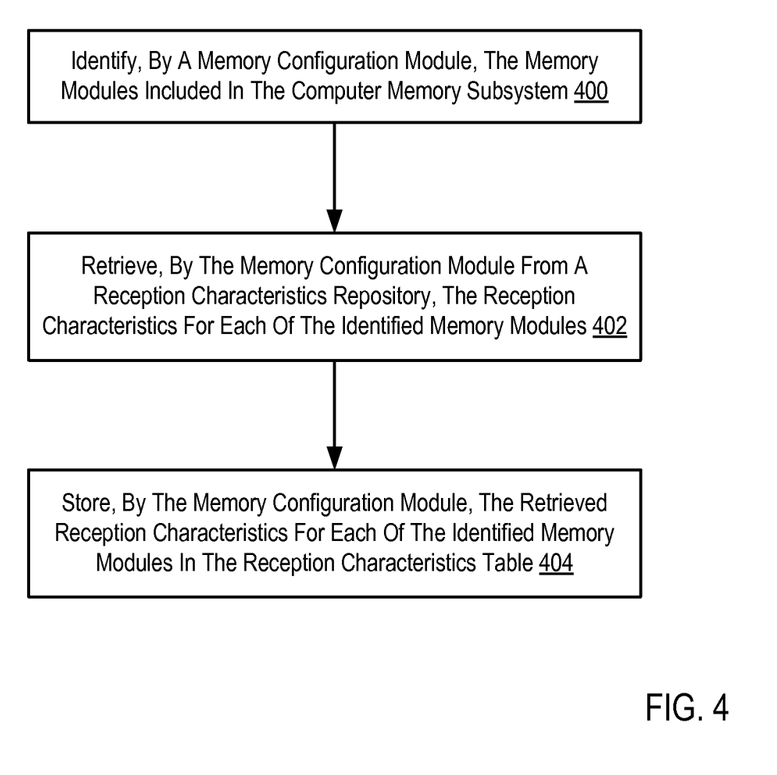
FIG. 4 sets forth a flow chart illustrating a further exemplary method of signal quality enhancement in a computer memory subsystem according to embodiments of the present invention FIG. 5 sets forth a flow chart illustrating a further exemplary method of signal quality enhancement in a computer memory subsystem according to embodiments of the present invention FIG. 6 sets forth a flow chart illustrating a further exemplary method of signal quality enhancement in a computer memory subsystem according to embodiments of the present invention

The method of FIG. 4 includes identifying (400), by a memory configuration module, the memory modules included in the computer memory subsystem. The memory configuration module may be implemented as computer program instructions stored in non-volatile memory. The memory configuration module may identify (400) the memory modules included in the computer memory subsystem according to the method of FIG. 4 by retrieving an identifier for each of the memory modules from an serial presence detect ('SPD') EEPROM installed on each memory module. SPD is described in JEDEC Standard No. 21-C and refers to a standardized way of accessing information about a computer memory module from an EEPROM mounted on the memory module.

The method of FIG. 4 also includes retrieving (402), by the memory configuration module from a reception characteristics repository, the reception characteristics for each of the identified memory modules. As mentioned above, the reception characteristics repository is a data structure that stores reception characteristics for each of the memory modules supported by a particular computing system. The reception characteristics for each of the memory modules supported by the computing system may be determined by the designer or manufacturer of the computing system and embedded in non-volatile memory for use during the boot process when the memory controller is configured.

The method of FIG. 4 also includes storing (404), by the memory configuration module, the retrieved reception characteristics for each of the identified memory modules in the reception characteristics table of the memory controller. The memory configuration module may store (404) the retrieved reception characteristics for each of the identified memory modules in the reception characteristics table of the memory controller according to the method of FIG. 4 by writing the values for the retrieved reception characteristics into memory or registers in the memory controller that implement the reception characteristics table.

In addition to enhancing signal quality of signals received from the memory modules, a memory controller improved according to embodiments of the present invention may also enhance signal quality of signals transmitted to the memory modules. For further explanation, therefore, FIG. 5 sets forth a flow chart illustrating a further exemplary method of signal quality enhancement in a computer memory subsystem according to embodiments of the present invention.

Figure 5:
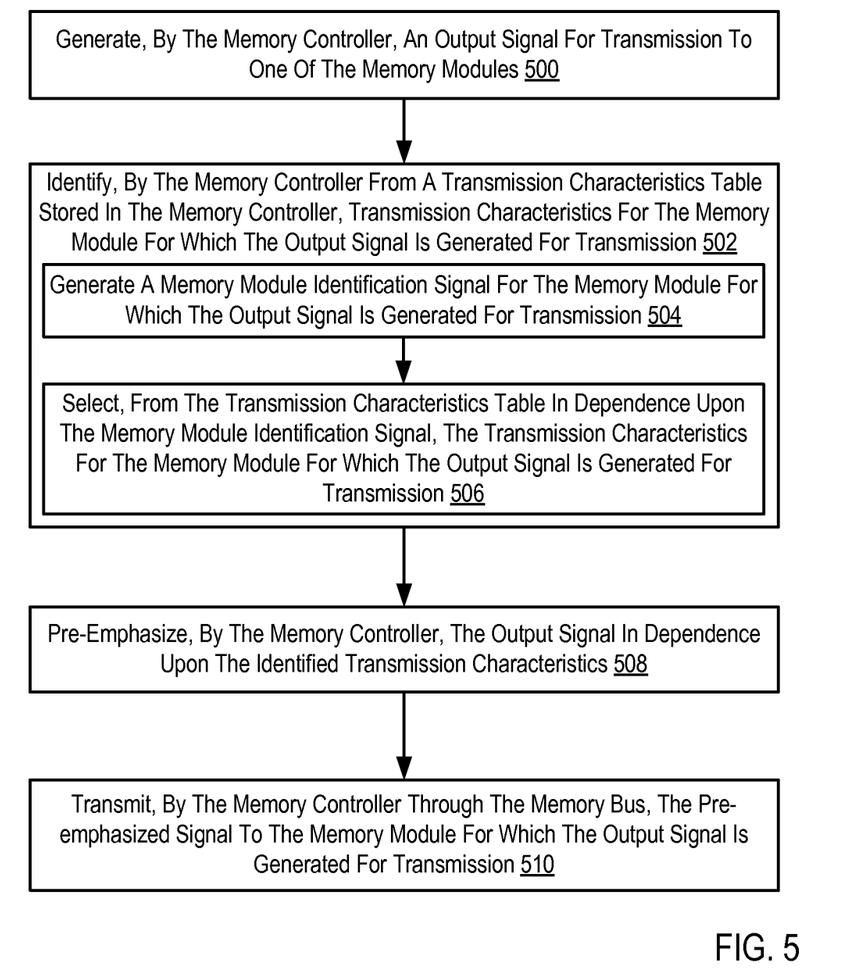

The method of FIG. 5 includes generating (500), by the memory controller, an output signal for transmission to one of the memory modules. The memory controller may generate (500) an output signal for transmission to one of the memory modules according to the method of FIG. 5 by receiving a bit value of '0' or '1' as part of a write operation to a particular memory address on one of the memory modules installed in a computing system and transforming that bit value into a voltage signal for transmission to the memory module through the memory bus that connects the memory module to the memory controller.

The method of FIG. 5 also includes identifying (502), by the memory controller from a transmission characteristics table stored in the memory controller, transmission characteristics for the memory module for which the output signal is generated for transmission. Identifying (502) transmission characteristics for the memory module for which the output signal is generated for transmission according to the method of FIG. 5 includes generating (504) a memory module identification signal for the memory module for which the output signal is generated for transmission and selecting (506), from the transmission characteristics table in dependence upon the memory module identification signal, the transmission characteristics for the memory module for which the output signal is generated for transmission. The memory controller may generate (504) a memory module identification signal for the memory module for which the output signal is generated for transmission according to the method of FIG. 5 using the memory address for the write operation used to write data to the memory module. The memory controller may select (506), from the transmission characteristics table, the transmission characteristics for the memory module for which the output signal is generated for transmission according to the method of FIG. 5 by using a multiplexer and providing the memory module identification signal to the multiplexer on the multiplexer's selection input.

The method of FIG. 5 includes pre-emphasizing (508), by the memory controller, the output signal in dependence upon the identified transmission characteristics. The memory controller may pre-emphasize (508) the output signal in dependence upon the identified transmission characteristics according to the method of FIG. 5 by receiving the transmission characteristics as parameters into a pre-emphasizer and using the pre-emphasizer to pre-distort the output signal to counteract the signal distortion caused by the transmission pathway between the memory controller and the memory module.

The method of FIG. 5 includes transmitting (510), by the memory controller through the memory bus, the pre-emphasized output signal to the memory module for which the output signal is generated for transmission. The memory controller may transmit (510) the pre-emphasized output signal to the memory module for which the output signal is generated for transmission through the memory bus according to the method of FIG. 5 by receiving the pre-emphasized output signal from a pre-emphasizer and places the pre-emphasized output signal on the memory bus using a transmission buffer.

As mentioned above, the memory controller identifies transmission characteristics for the memory module from which the input signal is received from a transmission characteristics table stored in the memory controller. In a manner similar to the reception characteristics, the reception characteristics for each of the memory modules installed in the computing system may be stored in the reception characteristics table during the boot process of the computing system. For further explanation, therefore, FIG. 6 sets forth a flow chart illustrating a further exemplary method of signal quality enhancement in a computer memory subsystem according to embodiments of the present invention.

Figure 6:
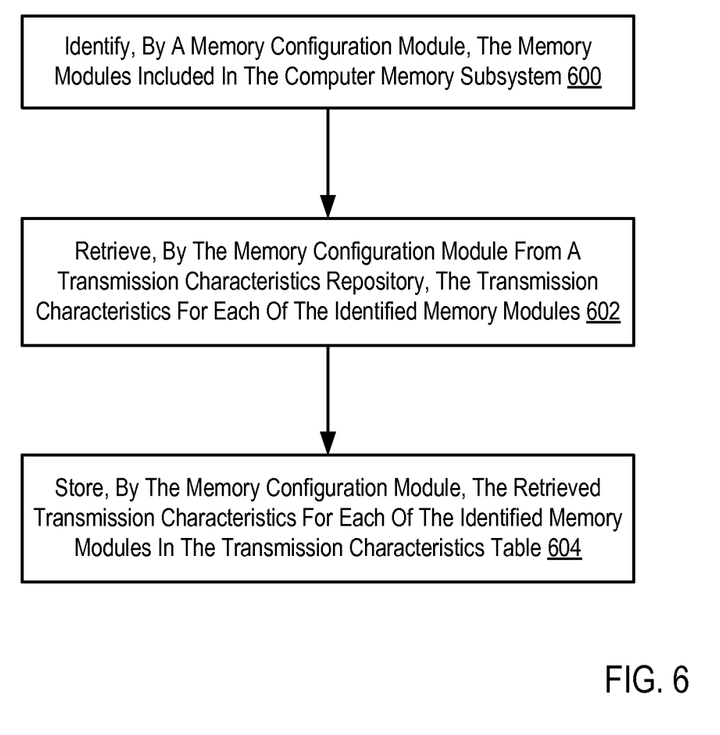

The method of FIG. 6 includes identifying (600), by a memory configuration module, the memory modules included in the computer memory subsystem. The memory configuration module may identify (600) the memory modules included in the computer memory subsystem according to the method of FIG. 6 by retrieving an identifier for each of the memory modules from an SPD EEPROM installed on each memory module.

The method of FIG. 6 also includes retrieving (602), by the memory configuration module from a transmission characteristics repository, the transmission characteristics for each of the identified memory modules. As mentioned above, the transmission characteristics repository is a data structure that stores reception characteristics for each of the memory modules supported by a particular computing system. The transmission characteristics for each of the memory modules supported by the computing system may be determined by the designer or manufacturer of the computing system and embedded in non-volatile memory for use during the boot process when the memory controller is configured.

The method of FIG. 6 includes storing (604), by the memory configuration module, the retrieved transmission characteristics for each of the identified memory modules in the transmission characteristics table. The memory configuration module may store (604) the retrieved transmission characteristics for each of the identified memory modules in the transmission characteristics table according to the method of FIG. 6 by writing the values for the retrieved transmission characteristics into memory or registers in the memory controller that implement the transmission characteristics table.

Persons skilled in the art will recognize immediately that, although some of the exemplary embodiments described in this specification are oriented to computer program instructions installed and executing on computer hardware, nevertheless, alternative embodiments implemented as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer memory subsystem for enhancing signal quality, the computer memory subsystem comprising:
one or more memory modules;
a memory bus; and
a memory controller connected to the memory modules through the memory bus,
the memory controller including a reception buffer connected to the memory bus, the reception buffer capable of receiving an input signal from one of the memory modules,
the memory controller including a reception characteristics table capable of storing reception characteristics for each of the memory modules connected to the memory controller, the reception characteristics of each memory module comprising a description of a modification by the memory controller of an input signal received from the memory module to correct signal distortion of the input signal introduced by the transmission path between that memory module and the memory controller,
the memory controller including an equalizer connected to the reception buffer and the reception characteristics table, the equalizer capable of equalizing the received input signal in dependence upon the reception characteristics for the memory module from which the input signal was received,
the memory controller including memory controller logic connected to the equalizer, the memory controller logic capable of processing the equalized input signal;
wherein the memory controller includes a transmission characteristics table capable of storing transmission characteristics for each of the memory modules connected to the memory controller;
wherein the memory controller logic is capable of generating an output signal for transmission to one of the memory modules;
wherein the memory controller includes a pre-emphasizer connected to the memory controller logic and the transmission characteristics table, the pre-emphasizer capable of pre-emphasizing the output signal in dependence upon the transmission characteristics for the memory module for which the output signal is generated for transmission; and
wherein the memory controller includes a transmission multiplexer connected to the memory controller logic, the transmission characteristics table, and the pre-emphasizer, the transmission multiplexer capable of receiving from the memory controller logic a memory module identification (MMID) signal that specifies the memory module from which the input signal was received, wherein the MMID signal is based on the memory address for the data being stored in the memory modules.

2. The computer memory subsystem of claim 1 wherein the memory controller includes a reception multiplexer connected to the memory controller logic, the reception characteristics table, and the equalizer, the reception multiplexer capable of receiving from the memory controller logic a memory module identification signal that specifies the memory module from which the input signal was received, the reception multiplexer capable of receiving from the reception characteristics table the reception characteristics for each of the memory modules and providing to the equalizer the reception characteristics for the memory module specified by the memory module identification signal.

3. The computer memory subsystem of claim 1 wherein the computer memory subsystem is connected to a processor, the processor operatively coupled to non-volatile memory including computer program instructions capable of:
identifying the memory modules included in the computer memory subsystem;
retrieving, from a reception characteristics repository, the reception characteristics for each of the identified memory modules; and
storing the retrieved reception characteristics for each of the identified memory modules in the reception characteristics table of the memory controller.

4. The computer memory subsystem of claim 1 wherein wherein the memory controller includes a transmission buffer connected to the memory bus and the pre-emphasizer, the transmission buffer capable of transmitting the pre-emphasized output signal to the memory module through the memory bus.

5. The computer memory subsystem of claim 4 the transmission multiplexer capable of receiving from the transmission characteristics table the transmission characteristics for each of the memory modules and providing to the pre-equalizer the transmission characteristics for the memory module specified by the memory module identification signal.

6. The computer memory subsystem of claim 4 wherein the computer memory subsystem is connected to a processor, the processor operatively coupled to non-volatile memory including computer program instructions capable of:
   identifying the memory modules included in the computer memory subsystem;
   retrieving, from a transmission characteristics repository, the transmission characteristics for each of the identified memory modules; and
   storing the retrieved transmission characteristics for each of the identified memory modules in the transmission characteristics table of the memory controller.

7. A method of signal quality enhancement in a computer memory subsystem, the method comprising:
   receiving, by a memory controller, an input signal from one of one or more memory modules included in the computer memory subsystem, the memory modules connected to the memory controller through a memory bus;
   identifying, by the memory controller from a reception characteristics table stored in the memory controller, reception characteristics for the memory module from which the input signal is received, the reception characteristics comprising a description of a modification by the memory controller of the input signal received from the memory module to correct signal distortion of the input signal introduced by the transmission path between that memory module and the memory controller;
   equalizing, by the memory controller, the input signal in dependence upon the identified reception characteristics;
   processing, by the memory controller, the equalized signal;
   generating, by the memory controller, an output signal for transmission to one of the memory modules;
   identifying, by the memory controller from a transmission characteristics table stored in the memory controller, transmission characteristics for the memory module for which the output signal is generated for transmission, wherein identifying, by the memory controller from a transmission characteristics table stored in the memory controller, transmission characteristics for the memory module for which the output signal is generated for transmission includes generating a memory module identification (MMID) signal for the memory module for which the output signal is generated for transmission, wherein the MMID signal is based on the memory address for the data being stored in the memory modules.

8. The method of claim 7 wherein identifying, by the memory controller from a reception characteristics table stored in the memory controller, reception characteristics for the memory module from which the input signal is received further comprises:
   generating a memory module identification signal for the memory module from which the input signal is received; and
   selecting, from the reception characteristics table in dependence upon the memory module identification signal, the reception characteristics for the memory module from which the input signal is received.

9. The method of claim 7 further comprising:
   identifying, by a memory configuration module, the memory modules included in the computer memory subsystem;
   retrieving, by the memory configuration module from a reception characteristics repository, the reception characteristics for each of the identified memory modules; and
   storing, by the memory configuration module, the retrieved reception characteristics for each of the identified memory modules in the reception characteristics table.

10. The method of claim 7 further comprising:
    pre-emphasizing, by the memory controller, the output signal in dependence upon the identified transmission characteristics; and
    transmitting, by the memory controller through the memory bus, the pre-emphasized output signal to the memory module for which the output signal is generated for transmission.

11. The method of claim 10 wherein identifying, by the memory controller from a transmission characteristics table stored in the memory controller, transmission characteristics for the memory module for which the output signal is generated for transmission:
    selecting, from the transmission characteristics table in dependence upon the memory module identification signal, the transmission characteristics for the memory module for which the output signal is generated for transmission.

12. The method of claim 10 further comprising:
    identifying, by a memory configuration module, the memory modules included in the computer memory subsystem;
    retrieving, by the memory configuration module from a transmission characteristics repository, the transmission characteristics for each of the identified memory modules; and
    storing, by the memory configuration module, the retrieved transmission characteristics for each of the identified memory modules in the transmission characteristics table.

13. A system of signal quality enhancement in a computer memory subsystem, the system comprising:
    means for receiving, in a memory controller, an input signal from one of one or more memory modules included in the computer memory subsystem, the memory modules connected to the memory controller through a memory bus;
    means for identifying, by the memory controller from a reception characteristics table stored in the memory controller, reception characteristics for the memory module from which the input signal is received, the reception characteristics comprising a description of a modification by the memory controller of the input signal received from the memory module to correct signal distortion of the input signal introduced by the transmission path between that memory module and the memory controller;

means for equalizing, by the memory controller, the input signal in dependence upon the identified reception characteristics;

means for processing, by the memory controller, the equalized signal;

means for generating, by the memory controller, an output signal for transmission to one of the memory modules;

means for identifying, by the memory controller from a transmission characteristics table stored in the memory controller, transmission characteristics for the memory module for which the output signal is generated for transmission, wherein the means for identifying, by the memory controller from a transmission characteristics table stored in the memory controller, transmission characteristics for the memory module for which the output signal is generated for transmission includes means for generating a memory module identification (MMID) signal for the memory module for which the output signal is generated for transmission, wherein the MMID signal is based on the memory address for the data being stored in the memory modules.

14. The system of claim 13 wherein means for identifying, by the memory controller from a reception characteristics table stored in the memory controller, reception characteristics for the memory module from which the input signal is received further comprises:

means for generating a memory module identification signal for the memory module from which the input signal is received; and means for selecting, from the reception characteristics table in dependence upon the memory module identification signal, the reception characteristics for the memory module from which the input signal is received.

15. The system of claim 13 further comprising:

means for identifying the memory modules included in the computer memory subsystem;

means for retrieving, from a reception characteristics repository, the reception characteristics for each of the identified memory modules; and means for storing the retrieved reception characteristics for each of the identified memory modules in the reception characteristics table.

16. The system of claim 13 further comprising:

means for pre-emphasizing, by the memory controller, the output signal in dependence upon the identified transmission characteristics; and means for transmitting, by the memory controller through the memory bus, the pre-emphasized output signal to the memory module for which the output signal is generated for transmission.

17. The system of claim 16 wherein means for identifying, by the memory controller from a transmission characteristics table stored in the memory controller, transmission characteristics for the memory module for which the output signal is generated for transmission:

means for selecting, from the transmission characteristics table in dependence upon the memory module identification signal, the transmission characteristics for the memory module for which the output signal is generated for transmission.

18. The system of claim 16 further comprising:

means for identifying the memory modules included in the computer memory subsystem;

means for retrieving, from a transmission characteristics repository, the transmission characteristics for each of the identified memory modules; and means for storing the retrieved transmission characteristics for each of the identified memory modules in the transmission characteristics table.

\* \* \* \* \*